United States Patent
Georgin et al.

(10) Patent No.: US 10,703,464 B2
(45) Date of Patent: Jul. 7, 2020

(54) ARCHITECTURE FOR LOCKED WHEEL AND ANTISKID PERFORMANCE

(71) Applicant: GOODRICH CORPORATION, Charlotte, NC (US)

(72) Inventors: Marc Georgin, Dayton, OH (US); Michael Kordik, Dayton, OH (US)

(73) Assignee: GOODRICH CORPORATION, Charlotte, NC (US)

(*) Notice: Subject to any disclaimer, the term of this patent is extended or adjusted under 35 U.S.C. 154(b) by 154 days.

(21) Appl. No.: 16/033,967

(22) Filed: Jul. 12, 2018

(65) Prior Publication Data

US 2020/0017202 A1    Jan. 16, 2020

(51) Int. Cl.
| | | |
|---|---|---|
| *B60T 8/17* | (2006.01) | |
| *B64C 25/46* | (2006.01) | |
| *B60T 8/1761* | (2006.01) | |
| *B60T 8/32* | (2006.01) | |

(52) U.S. Cl.
CPC ............ *B64C 25/46* (2013.01); *B60T 8/1703* (2013.01); *B60T 8/1761* (2013.01); *B60T 8/325* (2013.01); *B60T 2240/00* (2013.01); *B60T 2270/10* (2013.01)

(58) Field of Classification Search
CPC ..... B64C 25/46; B60T 8/1703; B60T 8/1761; B60T 8/325; B60T 2240/00; B60T 2270/10
See application file for complete search history.

(56) References Cited

U.S. PATENT DOCUMENTS

| | | | |
|---|---|---|---|
| 4,536,041 A | 8/1985 | Kosolapov et al. | |
| 4,828,335 A | 5/1989 | Fuller et al. | |
| 5,472,268 A | 12/1995 | Ando et al. | |
| 5,775,785 A | 7/1998 | Harris et al. | |
| 6,663,192 B2 | 12/2003 | Bourguet et al. | |
| 7,021,725 B2* | 4/2006 | Kokubo | B60T 8/405 303/11 |
| 7,128,376 B2* | 10/2006 | Williams | B60T 8/1703 303/15 |
| 7,240,972 B2* | 7/2007 | Nakano | B60T 8/172 303/150 |
| 7,278,316 B2* | 10/2007 | Satou | B60T 8/172 73/669 |
| 7,278,694 B2* | 10/2007 | Choi | B60T 8/17616 303/156 |
| 8,118,256 B2* | 2/2012 | Cahill | B60T 8/90 244/111 |

(Continued)

FOREIGN PATENT DOCUMENTS

CN    105000006    10/2015

OTHER PUBLICATIONS

European Patent Office, European Search Report dated Nov. 29, 2019 in Application No. 19185587.3.

*Primary Examiner* — Thomas W Irvin

(74) *Attorney, Agent, or Firm* — Snell & Wilmer, L.L.P.

(57) ABSTRACT

Braking control systems and methods, such as for an aircraft, use a dump valve to rapidly decrease hydraulic pressure applied to a brake actuator during a wheel skid condition. In response to the wheel speed recovering, the dump valve is commanded closed and the brake control system returns to normal braking. The dump valve and a servovalve may work harmoniously for locked wheel brake control.

19 Claims, 4 Drawing Sheets

(56) References Cited

U.S. PATENT DOCUMENTS

| | | | | |
|---|---|---|---|---|
| 8,434,301 | B2 * | 5/2013 | Fukui | F04B 49/002 |
| | | | | 60/405 |
| 8,538,635 | B2 * | 9/2013 | Uematsu | B60T 8/175 |
| | | | | 701/48 |
| 10,093,296 | B2 * | 10/2018 | Ayichew | B60T 13/662 |
| 10,266,161 | B2 * | 4/2019 | Odate | B60T 7/22 |
| 10,442,422 | B2 * | 10/2019 | Kordik | F16K 37/0041 |
| 2004/0239173 | A1 | 12/2004 | Williams et al. | |
| 2018/0056953 | A1 * | 3/2018 | Kato | B60T 7/12 |

* cited by examiner

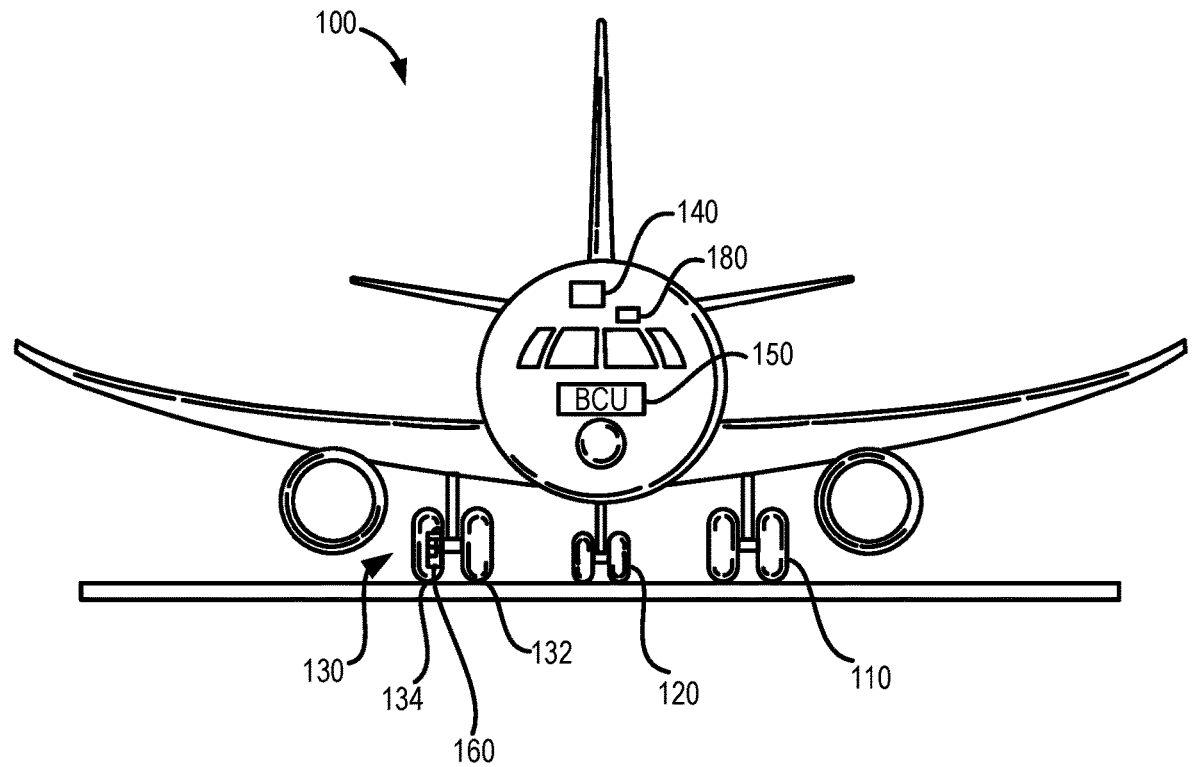
FIG. 1-A

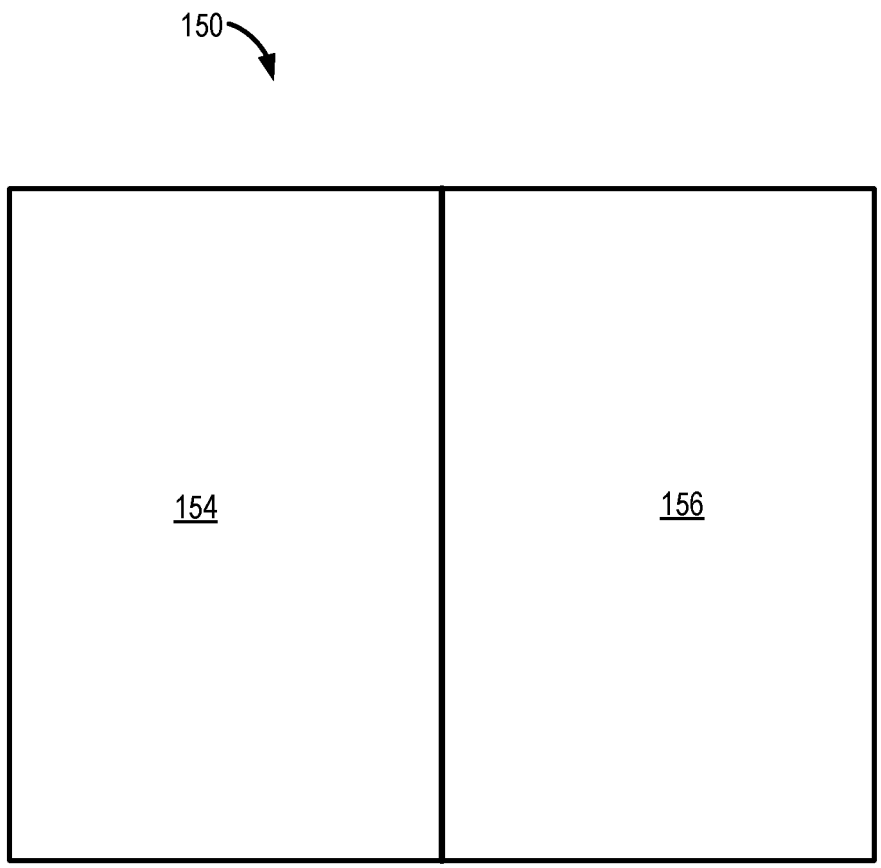
FIG. 1-B

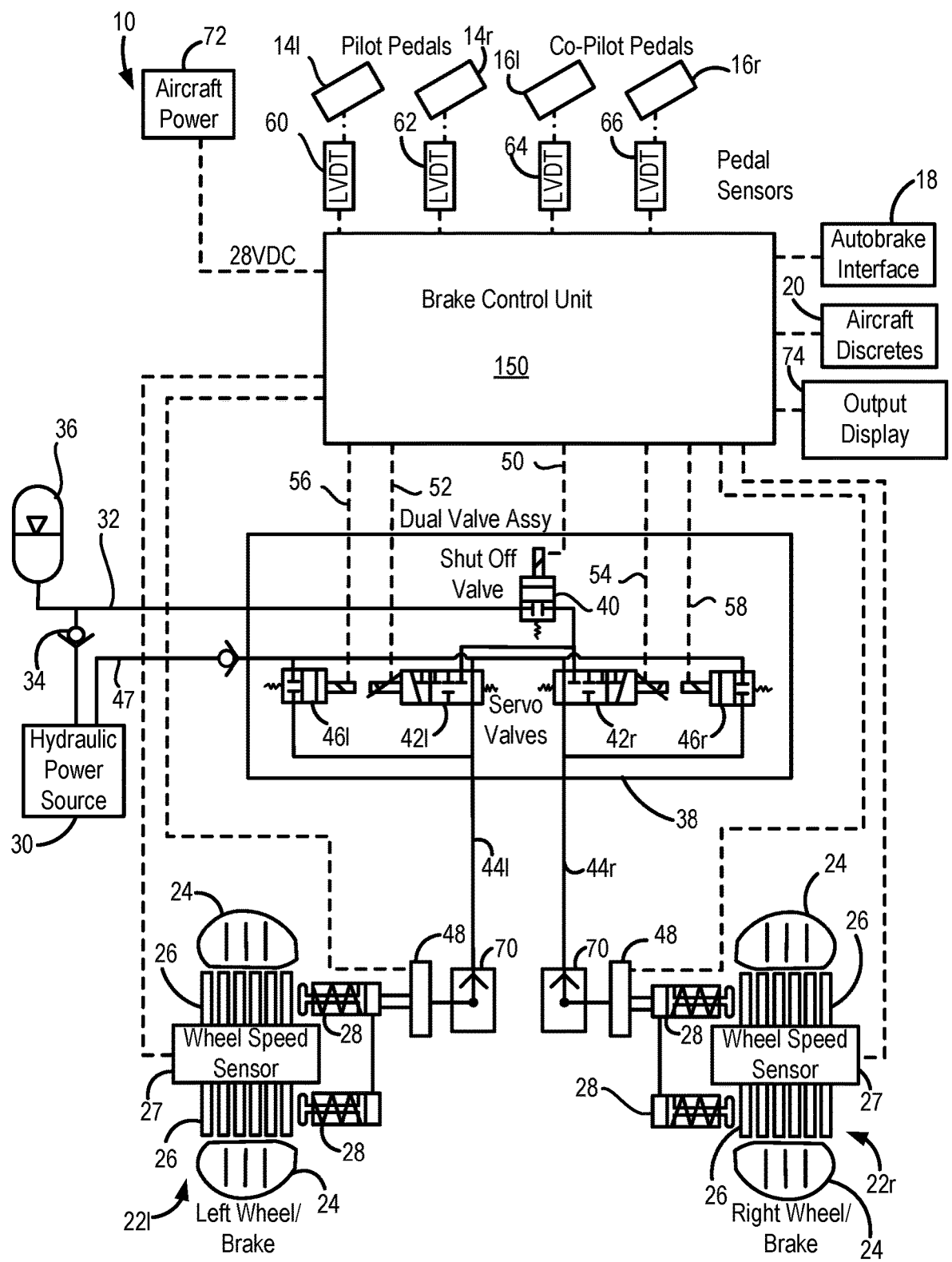
FIG. 1-C

ARCHITECTURE FOR LOCKED WHEEL AND ANTISKID PERFORMANCE

FIELD

In general, the arrangements disclosed herein relate to braking systems and methods. More specifically, they relate to improvements for braking systems and methods suitable for use in aircraft.

BACKGROUND

Aircraft include many parts that are suitable for monitoring and periodic replacement. For example, many aircraft braking systems include one or more servo valves suited for converting variations in an electrical signal into variations in how much hydraulic fluid is transmitted to a brake actuator. Such servo valves can be used to control powerful hydraulic cylinders with small electrical signals. They can provide precise levels of control over force, position, pressure, and velocity, etc., such as by electrically coupling to a power source to apply a desired amount of electrical current to the servo valve in order to actuate a poppet internal to the servo valve and suitably open or close the servo valve to thus control the amount of hydraulic pressure output by the servo valve. Sensors in communication with servo valves can monitor the amount of electrical current (electrical signal) input into the servo valve and the corresponding hydraulic pressure output from the servo valve (hydraulic pressure signal).

Typically, transport aircraft utilize antiskid systems to control wheel skidding during braking. Uncontrolled skids, or "lockups" may result in greatly reduced braking effectiveness, loss of tire cornering ("road-holding") capability, and tire flatspots or blowouts. During most braking conditions, this skid protection is achieved by circuits or mechanisms which release braking pressure, via the servo valve(s), to a single (or group of) wheel(s) upon detection of a sudden decrease in wheel speed. Servo valves comprise relatively tortuous paths through which the hydraulic fluid travels in order to release the braking pressure.

SUMMARY

A brake control system is disclosed, comprising a non-transitory memory configured to store instructions, and a controller in electronic communication with the memory, the controller configured to control a servo valve, determine whether a locked wheel condition is detected, command a dump valve to open in response to the locked wheel condition being detected to release the hydraulic fluid from the hydraulic line, determine whether a wheel speed has recovered, and command the dump valve closed in response to the wheel speed being recovered.

In various embodiments, the brake control system further comprises a brake control module, comprising a shutoff valve configured to receive a hydraulic fluid, the servo valve configured to receive the hydraulic fluid from the shutoff valve and configured to provide the hydraulic fluid to apply braking force to a wheel via a hydraulic line, and the dump valve, wherein the dump valve is in fluid communication with the hydraulic line.

In various embodiments, the controller determines whether the locked wheel condition is detected by determining whether a rotational velocity of the wheel has decreased below a first pre-determined threshold value.

In various embodiments, the controller determines whether the wheel speed has recovered by determining whether the rotational velocity of the wheel has increased above a second pre-determined threshold value.

In various embodiments, the controller commands the dump valve open by sending a dump valve control signal to the dump valve.

In various embodiments, the controller commands the dump valve closed by ceasing to send the dump valve control signal to the dump valve.

In various embodiments, the dump valve is connected in parallel with the servo valve.

In various embodiments, the dump valve comprises a left wheel dump valve, the servo valve comprises a left wheel servo valve, and the brake control module further comprises a right wheel dump valve and a right wheel servo valve, wherein the right wheel dump valve is connected in parallel with the right wheel servo valve.

A brake control system is disclosed herein, comprising a brake control module, comprising a shutoff valve configured to receive a hydraulic fluid, a servo valve configured to receive the hydraulic fluid from the shutoff valve and configured to provide the hydraulic fluid to apply braking force to a wheel via a hydraulic line, and a dump valve in fluid communication with the hydraulic line.

In various embodiments, the dump valve is connected in parallel with the servo valve.

In various embodiments, dump valve and the servo valve are in fluid communication with a return line, whereby hydraulic pressure in the hydraulic line may be released.

In various embodiments, the dump valve is a left wheel dump valve, the servo valve is a left wheel servo valve, the wheel is a left wheel, and the brake control module further comprises a right wheel dump valve and a right wheel servo valve, wherein the left wheel dump valve is connected in parallel with the right wheel servo valve and the right wheel dump valve is connected in parallel with the right wheel servo valve.

In various embodiments, the left wheel dump valve is configured to be commanded open in response to a rotational velocity of the left wheel decreasing below a first predetermined threshold value during a braking maneuver.

In various embodiments, the left wheel dump valve is configured to release the hydraulic fluid from the hydraulic line in response to being opened to decrease the braking force to the left wheel.

In various embodiments, the left wheel dump valve is configured to be commanded closed in response to the rotational velocity of the left wheel increasing above a second predetermined threshold value during the braking maneuver.

A method for locked wheel brake control is disclosed, comprising determining whether a locked wheel condition is detected, commanding a dump valve open in response to the locked wheel condition being detected to release a hydraulic fluid from a hydraulic line, determining whether a wheel speed has recovered, and commanding the dump valve closed in response to the wheel speed being recovered.

In various embodiments, the locked wheel condition is detected by determining whether a rotational velocity of a wheel has decreased below a first pre-determined threshold value.

In various embodiments, determining whether the wheel speed has recovered includes determining whether the rotational velocity of the wheel has increased above a second pre-determined threshold value.

In various embodiments, the dump valve is commanded open by sending a dump valve control signal to the dump valve.

In various embodiments, the dump valve is commanded closed by ceasing to send the dump valve control signal to the dump valve.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

In various embodiments, FIG. 1-A illustrates an aircraft having multiple landing gear and brakes;

Figure 2:
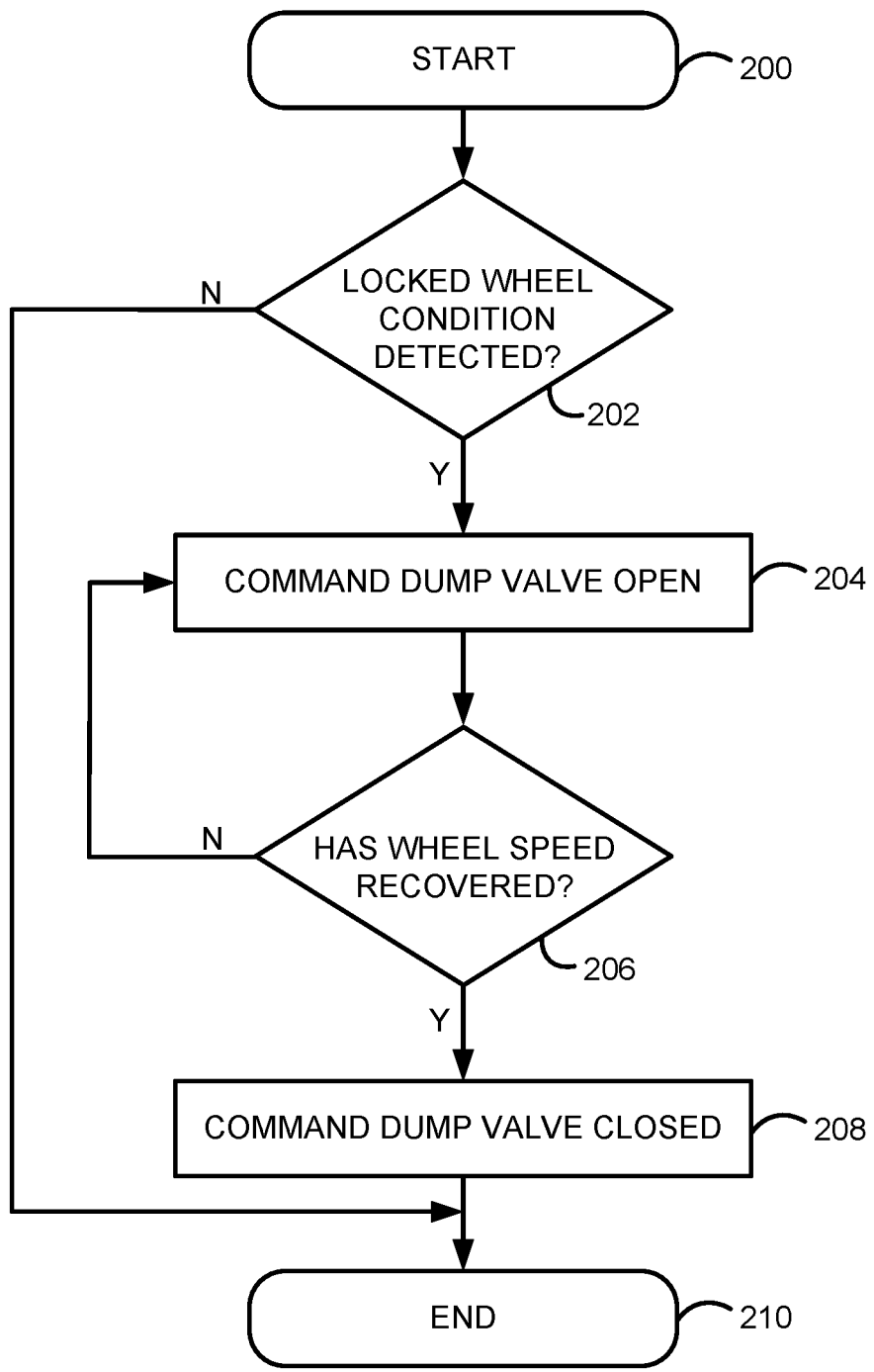

In various embodiments, FIG. 1-B is a block diagram of a brake control unit of the aircraft of FIG. 1-A;

In various embodiments, FIG. 1-C is a functional diagram of a braking system of the aircraft of FIG. 1-A, having dump valves in the brake control module for rapid locked wheel control;

In various embodiments, FIG. 2 is a flowchart of a method of locked wheel brake control.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

Provided herein, according to various embodiments, are systems and methods for brake control with antiskid protection, such as within a braking system of an aircraft. While numerous details are included herein pertaining to aircraft components, such as brake components, the systems and methods disclosed herein can be applied to other systems with other servo valves and the like. A brake control system, as disclosed herein, includes a dump valve for rapid release, or "dumping," of hydraulic pressure in response to a wheel skid condition being detected. The dump valve provides a relatively smooth path through which hydraulic pressure is released from the hydraulic lines, bypassing the servo valve. A brake control system as provided herein may provide rapid locked wheel response.

Referring now to FIG. 1-A, an aircraft 100 includes multiple landing gear systems, including a first landing gear 110, second landing gear 120, and third landing gear 130. The first landing gear 110, second landing gear 120, and third landing gear 130 each include one or more wheel assemblies. For example, the third landing gear 130 includes an inner wheel assembly 132 and an outer wheel assembly 134. The first landing gear 110, second landing gear 120, and third landing gear 130 support the aircraft 100 when the aircraft 100 is not flying, thereby allowing the aircraft 100 to take off, land, and taxi without damaging the aircraft 100. In various embodiments, the second landing gear 120 is also a nose landing gear for the aircraft 100, and oftentimes, one or more of the first landing gear 110, second landing gear 120, and third landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the avionics unit 140 controls, at least various parts of, the flight of, and operation of various components of, the aircraft 100. For example, the avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

In various embodiments, the aircraft 100 further includes a brake control unit (BCU) 150. With brief reference now to FIG. 1-B, the BCU 150 includes one or more controllers 154 (e.g., processors) and one or more tangible, non-transitory memories 156 capable of implementing digital or programmatic logic. In various embodiments, for example, the one or more controllers 154 are one or more of a general purpose processor, DSP, ASIC, FPGA, or other programmable logic device, discrete gate, transistor logic, or discrete hardware components, or any various combinations thereof or the like, and the one or more memories 156 store instructions that are implemented by the one or more controllers 154 for performing various functions, such as monitoring a health status of a servo valve, as will be discussed herein. In various embodiments, the BCU 150 controls, at least various parts of, the braking of the aircraft 100. For example, the BCU 150 controls various parameters of braking, such as manual brake control, automatic brake control, antiskid braking, locked wheel protection, touchdown protection, park capability, gear retraction braking, and the like.

Referring again more particularly to FIG. 1-A, the aircraft 100 further includes one or more brakes coupled to each wheel assembly. For example, a brake 160 is coupled to the outer wheel assembly 134 of the third landing gear 130 of the aircraft 100. In operation, the brake 160 applies a braking force to the outer wheel assembly 134 upon receiving a brake command, such as from the BCU 150. In various embodiments, the outer wheel assembly 134 of the third landing gear 130 of the aircraft 100 comprises any number of wheels.

Referring now also to FIG. 1-C, including with continued reference to FIGS. 1-A and 1-B as well, a closed-loop braking system 10 is shown in accordance with an embodiment of the inventive arrangements. The braking system 10 includes the brake control unit (BCU) 150 of FIGS. 1-A and 1-B, which is programmed to control some of the various braking functions described herein. In various embodiments, the braking system 10 enables the aircraft 100 to brake, thereby slowing aircraft 100 when on the ground. However, it will be appreciated that the braking system 10 may also be used in connection with other types of vehicles and other without departing from the scope of the inventive arrangements.

As described herein, the braking system generally includes, inter alia, a hydraulic power source 30 acting through i) a left wheel servo valve 42*l* to apply hydraulic pressure through a left hydraulic line 44*l* and shuttle valve 70 to apply a braking force to actuators 28 of a left wheel/brake assembly 22*l*; and ii) a right wheel servo valve 42*r* to apply hydraulic pressure through a right hydraulic line 44*r* and shuttle valve 70 to apply a braking force to actuators 28 of a right wheel/brake assembly 22*r*. First pressure sensors 48 may be intermediate, and in fluid communication with, the actuators 28 and shuttle valves 70 of the left wheel/brake assembly 22*l* and right wheel/brake assembly 22*r*.

In various embodiments, the shuttle valves 70, first pressure sensors 48, and actuators 28 may be common to both a primary braking system and a non-primary braking system of the braking system 10 of the aircraft 100.

In various embodiments of the braking system, the BCU 150 receives brake command signals from a left pilot brake pedal 14*l* and a right pilot brake pedal 14*r* and/or a left co-pilot brake pedal 16*l* and a right co-pilot brake pedal 16*r*. The brake command signals from the left pilot brake pedal 14*l* and the right pilot brake pedal 14*r* and/or the left co-pilot brake pedal 16*l* and the right co-pilot brake pedal 16*r* are indicative of a desired amount of braking. In addition, the BCU 150 receives control signals from an auto-brake interface 18 for performing conventional auto-brake and rejected take-off (RTO) braking functions. The BCU 150 also receives a series of discrete control signals associated with the aircraft 100, generally represented as 20, for providing braking control thereof.

In various embodiments, the BCU 150 controls braking of the left wheel/brake assembly 22*l* and the right wheel/brake assembly 22*r*, as noted above. The left wheel/brake assembly 22*l* includes one or more wheels 24 and brake stacks 26. A plurality of actuators 28 are provided for exerting braking forces on the brake stacks 26 in order to brake the wheels 24. The right wheel/brake assembly 22*r* has a similar, mirrored configuration. Both the left wheel/brake assembly 22*l* and the right wheel/brake assembly 22*r* also include, in various embodiments, wheel speed sensors 27 that provide wheel speed information to the BCU 150 for carrying out brake control operations.

In various embodiments of the braking system, a hydraulic power source 30 serves as a primary brake power supply within the braking system 10. In various embodiments, a primary hydraulic line 32 from the hydraulic power source 30 includes a check valve 34 and an accumulator 36. In various embodiments, the primary hydraulic line 32 is input into a brake control module (BCM) 38 included within the braking system 10. The BCM 38 includes a shutoff valve 40 through which the primary hydraulic line 32 supplies hydraulic fluid to the left wheel servo valve 42*l* and the right wheel servo valve 42*r*. In this regard, BCM may be a dual valve assembly. In various embodiments, hydraulic fluid from the left wheel servo valve 42*l* and the right wheel servo valve 42*r* is respectively provided through a left hydraulic line 44*l* and a right hydraulic line 44*r* to apply the braking force to the wheels 24 during a braking operation. In various embodiments, a return line 47 is provided from the left wheel servo valve 42*l* and the right wheel servo valve 42*r* back to the hydraulic power source 30.

During primary braking operations, hydraulic fluid pressure through the left hydraulic line 44*l* and the right hydraulic line 44*r* respectively passes to the corresponding actuators 28 via one or more of the corresponding shuttle valves 70. Thus, if the braking system 10 is functioning in the primary braking mode, the shutoff valve 40 is open to the left hydraulic line 44*l* and the right hydraulic line 44*r*, and the BCU 150 controls the amount of hydraulic pressure that is delivered to the wheels 24 respectively via the left wheel servo valve 42*l* and the right wheel servo valve 42*r* acting through the corresponding left hydraulic line 44*l* and right hydraulic line 44*r*.

In various embodiments, the shutoff valve 40, the left wheel servo valve 42*l*, and the right wheel servo valve 42*r* are coil valves. In various embodiments, the shutoff valve 40 receives a shutoff valve control signal on a bus 50 from the BCU 150. Similarly, the left wheel servo valve 42*l* may receive a servo valve control signal on a bus 52 from the BCU 150. Likewise, the right wheel servo valve 42*r* may receive a servo valve control signal on a bus 54 from the BCU 150.

In various embodiments, the left pilot brake pedal 14*l* may have a transducer 60 associated therewith. The transducer 60 may provide a brake command signal to the BCU 150 that is indicative of a degree of travel of the left pilot brake pedal 14*l*, and thus the amount of desired braking by the left wheel/brake assembly 22*l*.

Similarly, the remaining right pilot brake pedal 14*r*, the left co-pilot brake pedal 16*l*, and the right co-pilot brake pedal 16*r* each may have corresponding transducers respectively serving the BCU 150, including as follows: the right pilot brake pedal 14*r* includes transducer 62 serving the BCU 150; the left co-pilot brake pedal 16*l* includes transducer 64 serving the BCU 150; and the right co-pilot brake pedal 16*r* includes transducer 66 serving the BCU 150. The transducers may be collectively referred to herein as the transducers 60, 62, 64, 66. In various embodiments, the transducers 60, 62, 64, 66 for respectively detecting the degree of movement of the left pilot brake pedal 14*l* and the right pilot brake pedal 14*r* and/or the left co-pilot brake pedal 16*l* and the right co-pilot brake pedal 16*r* are each linear variable differential transformers (LVDTs). In various embodiments, it will be appreciated that other transducers may be used without departing from the scope of the inventive arrangements.

In various embodiments, the braking system 10 includes first pressure sensors 48 for monitoring the hydraulic pressure in the left hydraulic line 44*l* and the right hydraulic line 44*r* and providing such information back to the BCU 150. In addition, power to the BCU 150 is provided from an aircraft power source 72, such as a DC power source within the aircraft 100. In various embodiments, power is transmitted from the aircraft power source 72 to the BCU 150.

In various embodiments, the braking system 10 further includes an output device and/or output display 74 coupled to the BCU 150. The output device and/or output display 74 is configured to communicate information to the pilot, co-pilot, and/or maintenance crew relating to the braking operations. For example, in various embodiments, the output device and/or output display 74 includes a display, a speaker, a network access device, and/or the like that sends a message to a remote terminal, or the like. In various embodiments, the BCU 150 controls the output device and/or display 74 to output the health status of the braking system 10, including the various components thereof.

In various embodiments, the braking system 10 may be activated by the left pilot brake pedal 14*l*, the right pilot brake pedal 14*r*, the left co-pilot brake pedal 16*l*, and the right co-pilot brake pedal 16*r* respectively acting through the shutoff valve 40, the left wheel servo valve 42*l*, the right wheel servo valve 42*r*, the left hydraulic line 44*l*, and the right hydraulic line 44*r*.

The braking system 10 utilizes the shutoff valve 40 in-line with the left wheel servo valve 42*l* and the right wheel servo valve 42*r* to provide a level of redundancy that ensures a single valve failure cannot cause inadvertent braking. In order for the braking force to be applied by the braking system 10 to the left wheel/brake assembly 22*l* and the right wheel/brake assembly 22*r*, the shutoff valve 40 must be open along with at least one of the left wheel servo valve 42*l* and the right wheel servo valve 42*r*. To provide a redundancy so that the brakes can be operated when commanded, each of the valves (shutoff and servo) may contain dual control coils with one coil for different dedicated channels in the BCU 150, in accordance with various embodiments.

The BCU 150 utilizes outputs from the transducers 60, 62, 64, 66 to measure the degree to which each respective left pilot brake pedal 14*l*, right pilot brake pedal 14*r*, left co-pilot brake pedal 16*l*, and right co-pilot brake pedal 16*r* is depressed. And although one transducer is shown for each of the left pilot brake pedal 14*l*, the right pilot brake pedal 14*r*, the left co-pilot brake pedal 16*l*, and the right co-pilot brake pedal 16*r*, any number of transducers may be used, for example for redundancy purposes, in various embodiments. In various embodiments, the transducers 60, 62, 64, 66 provide inputs to the BCU 150.

In various embodiments, BCM 38 includes a left wheel dump valve 46*l* to dump hydraulic pressure from left hydraulic line 44*l* to prevent left wheel/brake assembly 22*l* from locking up while an aircraft is moving relative to the ground surface (i.e., to prevent "wheel skid"). Likewise, BCM 38 includes a right wheel dump valve 46*r* to dump hydraulic pressure from right hydraulic line 44*r* for preventing wheel skid of right wheel/brake assembly 22*r*. In this regard, dump valve 46*l* may be in fluid communication with left hydraulic line 44*l* and dump valve 46*r* may be in fluid communication with right hydraulic line 44*r*. In various embodiments, dump valve 46*l* is connected in parallel with left wheel servo valve 42*l* between left hydraulic line 44*l* and return line 47. In various embodiments, dump valve 46*r* is connected in parallel with right wheel servo valve 42*r* between right hydraulic line 44*r* and return line 47.

In various embodiments, the dump valve 46*l* and the dump valve 46*r* are coil valves. In contrast to the left wheel servo valve 42*l* and the right wheel servo valve 42*r*, the dump valve 46*l* and the dump valve 46*r* may be moveable between either an open position and a closed position, whereas left wheel servo valve 42*l* and the right wheel servo valve 42*r* are modulated for providing precise control of pressure within left hydraulic line 44*l* and right hydraulic line 44*r*. In contrast to left wheel servo valve 42*l* and the right wheel servo valve 42*r*, dump valves 46*l*, 46*r*, may provide rapid release of hydraulic pressure in left hydraulic line 44*l* and right hydraulic line 44*r*, respectively, due to the simple architecture of the dump valves 46*l*, 46*r*, whereas servo valves comprise relatively tortuous paths through which the hydraulic fluid must travel in order to escape left hydraulic line 44*l* and/or right hydraulic line 44*r*. In this regard, dump valve 46*l* and dump valve 46*r* may comprise shut-off valves. In various embodiments, dump valve 46*l* and dump valve 46*r* may be similar to shutoff valve 40 (e.g., a solenoid valve). In this regard, dump valve 46*l* and dump valve 46*r* may be moved to an open position in response to receiving electrical current and may be moved to a closed position in response to not receiving any electrical current. Dump valve 46*l* and dump valve 46*r* may comprise "ON/OFF" valves—that is electromechanical valves configured to actuate only between either a fully open position or a fully closed position. In this regard, in accordance with various embodiments, dump valve 46*l* and dump valve 46*r* may be moveable between only two positions—open or closed.

In various embodiments, the left wheel dump valve 46*l* may receive a dump valve control signal on a bus 56 from the BCU 150. Likewise, the right wheel dump valve 46*r* may receive a dump valve control signal on a bus 58 from the BCU 150. In response to the BCU 150 detecting a wheel skid condition in right wheel/brake assembly 22*r*, the BCU 150 may send the dump valve control signal to dump valve 46*r*, via bus 58, to open dump valve 46*r*, thereby removing hydraulic pressure from right hydraulic line 44*r* and reducing braking forces on the brake stack 26 of right wheel/brake assembly 22*r*. Likewise, in response to the BCU 150 detecting a wheel skid condition in left wheel/brake assembly 22*l*, the BCU 150 may send the dump valve control signal to dump valve 46*l*, via bus 56, to open dump valve 46*l*, thereby removing hydraulic pressure from left hydraulic line 44*l* and reducing braking forces on the brake stack 26 of left wheel/brake assembly 22*l*.

Referring now to FIG. 2, a method of locked wheel brake control is provided. More specifically, the method begins in a step 200, after which it is determined if a locked wheel condition is detected at a step 202. If a locked wheel condition is not detected at step 202, then the method ends at a step 210. In various embodiments, if a locked wheel condition is detected at step 202, then the method commands a dump valve open at a step 204. Thereafter, it is determined if the wheel speed has recovered at a step 206. If the wheel speed has not recovered in step 206, then the dump valve is commanded open at step 204. In various embodiments, if the wheel speed has recovered in step 206, then the method commands the dump valve closed at step 208, after which the method of FIG. 2 ends at step 210.

With combined reference to FIG. 1-C and FIG. 2, step 202 may include determining, by BCU 150, whether a locked wheel condition is detected. For example, the BCU may detect that the rotational velocity of left wheel/brake assembly 22*l* and/or the right wheel/brake assembly 22*r* is below a first pre-determined threshold value, via wheel speed sensors 27 for example, during a braking maneuver. Step 204 may include commanding, by BCU 150, dump valve 46*l* and/or dump valve 46*r* opened, in response to the locked wheel condition being detected. For example, step 204 may include sending, by BCU 150, a dump valve control signal to dump valve 46*l* and/or dump valve 46*r* to actuate dump valve 46*l* and/or dump valve 46*r* to an open position, whereby hydraulic fluid may travel from the corresponding left hydraulic line 44*l* and/or right hydraulic line 44*r* to hydraulic power source 30 via return line 47. Step 206 may include determining, by BCU 150 if the rotational velocity of left wheel/brake assembly 22*l* and/or the right wheel/brake assembly 22*r* has recovered from a locked wheel condition. For example, step 206 may include determining that the rotational velocity of left wheel/brake assembly 22*l* and/or the right wheel/brake assembly 22*r* is greater than a second pre-determined threshold value. Step 208 may include commanding, by BCU 150, dump valve 46*l* and/or dump valve 46*r* closed, in response to the rotational velocity of left wheel/brake assembly 22*l* and/or the right wheel/brake assembly 22*r* recovering, during a braking maneuver. For example, step 208 may include ceasing to send, by BCU 150, the dump valve control signal to dump valve 46*l* and/or dump valve 46*r* to actuate dump valve 46*l* and/or dump valve 46*r* to a closed position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A brake control system, comprising: a non-transitory memory configured to store instructions; and
    a controller in electronic communication with the memory, the controller configured to:
        control a shutoff valve, wherein the shutoff valve is configured to receive a hydraulic fluid pressure via a primary hydraulic line;
        control a servo valve, wherein the servo valve is configured to receive the hydraulic fluid pressure from the shutoff valve via an intermediate hydraulic line, and further configured to transmit the hydraulic fluid pressure to a brake actuator via a third hydraulic line to apply a braking force to a wheel;
        determine whether a locked wheel condition is detected;
        command a dump valve to open in response to the locked wheel condition being detected to release the hydraulic fluid pressure from the third hydraulic line into a return line via the dump valve, wherein the servo valve and the dump valve are connected in parallel between the third hydraulic line and the return line;
        determine whether a wheel speed has recovered; and
        command the dump valve closed in response to the wheel speed being recovered.

2. The brake control system of claim 1, further comprising a brake control module, comprising the shutoff valve, the servo valve, and the dump valve.

3. The brake control system of claim 2, wherein the controller determines whether the locked wheel condition is detected by determining whether a rotational velocity of the wheel has decreased below a first pre-determined threshold value.

4. The brake control system of claim 3, wherein the controller determines whether the wheel speed has recovered by determining whether the rotational velocity of the wheel has increased above a second pre-determined threshold value.

5. The brake control system of claim 2, wherein the controller commands the dump valve open by sending a dump valve control signal to the dump valve.

6. The brake control system of claim 5, wherein the controller commands the dump valve closed by ceasing to send the dump valve control signal to the dump valve.

7. The brake control system of claim 2, wherein:
    the dump valve comprises a left wheel dump valve;
    the servo valve comprises a left wheel servo valve; and
    the brake control module further comprises:
        a right wheel dump valve; and
        a right wheel servo valve, wherein the right wheel dump valve is connected in parallel with the right wheel servo valve.

8. A brake control system, comprising: a brake control module, comprising:

a shutoff valve configured to receive a hydraulic fluid pressure via a primary hydraulic line;

a servo valve configured to receive the hydraulic fluid pressure from the shutoff valve via an intermediate hydraulic line and configured to provide the hydraulic fluid pressure to apply braking force to a wheel via a third hydraulic line; and a dump valve in fluid communication with the third hydraulic line, wherein the dump valve is configured to be actuated to an open position in response to a locked wheel condition being detected to release the hydraulic fluid pressure from the third hydraulic line into a return line via the dump valve, wherein the servo valve and the dump valve are connected in parallel between the third hydraulic line and the return line.

9. The brake control system of claim 8, wherein the dump valve is connected in parallel with the servo valve.

10. The brake control system of claim 9, wherein dump valve and the servo valve are in fluid communication with a return line, whereby hydraulic pressure in the hydraulic line may be released.

11. The brake control system of claim 8, wherein:
the dump valve is a left wheel dump valve;
the servo valve is a left wheel servo valve;
the wheel is a left wheel; and
the brake control module further comprises:
 a right wheel dump valve; and
 a right wheel servo valve;
wherein the left wheel dump valve is connected in parallel with the left wheel servo valve and
the right wheel dump valve is connected in parallel with the right wheel servo valve.

12. The brake control system of claim 11, wherein the left wheel dump valve is configured to be commanded open in response to a rotational velocity of the left wheel decreasing below a first predetermined threshold value during a braking maneuver.

13. The brake control system of claim 12, wherein the left wheel dump valve is configured to release the hydraulic fluid from the hydraulic line in response to being opened to decrease the braking force to the left wheel.

14. The brake control system of claim 13, wherein the left wheel dump valve is configured to be commanded closed in response to the rotational velocity of the left wheel increasing above a second predetermined threshold value during the braking maneuver.

15. A method for locked wheel brake control, comprising:
controlling a shutoff valve, wherein the shutoff valve is configured to receive a hydraulic fluid pressure via a primary hydraulic line;
controlling a servo valve, wherein the servo valve is configured to receive the hydraulic fluid pressure from the shutoff valve via an intermediate hydraulic line, and further configured to transmit the hydraulic fluid pressure to a brake actuator via a third hydraulic line to apply a braking force to a wheel;
determining whether a locked wheel condition is detected;
commanding a dump valve open in response to the locked wheel condition being detected to release the hydraulic fluid pressure from the third hydraulic line into a return line via the dump valve, wherein the servo valve and the dump valve are connected in parallel between the third hydraulic line and the return line;
determining whether a wheel speed has recovered; and
commanding the dump valve closed in response to the wheel speed being recovered.

16. The method of claim 15, wherein the locked wheel condition is detected by determining whether a rotational velocity of a wheel has decreased below a first pre-determined threshold value.

17. The method of claim 16, wherein determining whether the wheel speed has recovered includes determining whether the rotational velocity of the wheel has increased above a second pre-determined threshold value.

18. The method of claim 15, wherein the dump valve is commanded open by sending a dump valve control signal to the dump valve.

19. The method of claim 18, wherein the dump valve is commanded closed by ceasing to send the dump valve control signal to the dump valve.

* * * * *